(12) United States Patent
    Fu et al.

(10) Patent No.: US 12,389,416 B2
(45) Date of Patent: Aug. 12, 2025

(54) METHOD FOR INFORMATION REPORTING, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 397 days.

(21) Appl. No.: 17/846,589

(22) Filed: Jun. 22, 2022

(65) Prior Publication Data

US 2022/0322422 A1    Oct. 6, 2022

Related U.S. Application Data

(63) Continuation of application No. PCT/CN2020/072533, filed on Jan. 16, 2020.

(51) Int. Cl.
    *H04L 5/00*    (2006.01)
    *H04W 72/23*   (2023.01)
    *H04W 80/02*   (2009.01)

(52) U.S. Cl.
    CPC .......... *H04W 72/23* (2023.01); *H04L 5/0092* (2013.01); *H04W 80/02* (2013.01)

(58) Field of Classification Search
    CPC ... H04L 5/0091; H04L 5/0092; H04L 5/0096; H04L 5/0098; H04W 72/1289; H04W 72/14; H04W 72/20; H04W 72/23; H04W 80/02
    See application file for complete search history.

(56) References Cited

U.S. PATENT DOCUMENTS

| 10,721,755 | B2* | 7/2020 | Jeon ...................... H04W 72/23 |
| 2016/0301513 | A1 | 10/2016 | He et al. |
| 2018/0376457 | A1 | 12/2018 | Tseng et al. |
| 2019/0174449 | A1 | 6/2019 | Shan et al. |
| 2019/0246421 | A1* | 8/2019 | Zhou ........................ H04L 5/00 |
| 2019/0342851 | A1 | 11/2019 | Shan et al. |
| 2019/0342911 | A1 | 11/2019 | Talarico et al. |
| 2019/0349983 | A1* | 11/2019 | Loehr ................... H04W 72/23 |

(Continued)

FOREIGN PATENT DOCUMENTS

| CN | 109428696 | 3/2019 |
| CN | 110536350 | 12/2019 |

(Continued)

OTHER PUBLICATIONS

EPO, Communication for EP Application No. 20914188.6, Apr. 28, 2023.

(Continued)

*Primary Examiner* — Alpus Hsu
(74) *Attorney, Agent, or Firm* — Hodgson Russ LLP (57) ABSTRACT

A method for information reporting, a terminal device, and a network device are provided. The method includes the following. A terminal device reports a media access control-control element (MAC CE) to a network device, where the MAC CE indicates a state of a configured grant (CG) configured by the network device for the terminal device.

8 Claims, 3 Drawing Sheets

(56) References Cited

U.S. PATENT DOCUMENTS

| | | | | |
|---|---|---|---|---|
| 2020/0413435 A1* | 12/2020 | Chin | ................. | H04W 72/23 |
| 2021/0022168 A1* | 1/2021 | Zhou | ................. | H04W 72/23 |
| 2022/0201742 A1* | 6/2022 | Zhao | ............. | H04W 72/0453 |

FOREIGN PATENT DOCUMENTS

| | | |
|---|---|---|
| CN | 110536438 | 12/2019 |
| WO | 2016158535 | 10/2016 |
| WO | 2019037586 A1 | 2/2019 |
| WO | 2019160474 | 8/2019 |

OTHER PUBLICATIONS

CNIPA, First Office Action for CN Application No. 202210503890.2, May 24, 2023.

CNIPA, Rejection Decision for CN Application No. 202210503890.2, Oct. 19, 2023.

EPO, Extended European Search Report and Opinion for EP Application No. 20914188.6, Sep. 21, 2022.

CNIPA, Second Office Action for CN Application No. 202210503890.2, Jul. 28, 2023.

EPO, Examination Report for EP Application No. 20914188.6, Sep. 25, 2023.

EPO, Communication for EP Application No. 20914188.6, Jan. 24, 2024.

"3rd Generation Partnership Project; Technical Specification Group Radio Access Network; Study on NR Industrial Internet of Things (IoT); (Release 16)," 3GPP TR 38.825, Mar. 2019, v16.0.0.

"3rd Generation Partnership Project; Technical Specification Group Radio Access Network; NR; Physical layer procedures for control (Release 16)," 3GPP TS 38.213, Mar. 2021, v16.5.0.

"3rd Generation Partnership Project; Technical Specification Group Radio Access Network, NR; Medium Access Control (MAC) protocol specification (Release 16)," 3GPP TS 38.321, Jun. 2021, v16.5.0.

"3rd Generation Partnership Project; Technical Specification Group Radio Access Network; NR; Radio Resource Control (RRC) protocol specification (Release 16)," 3GPP TS 38.331, Jun. 2021, v16.5.0.

Oppo, "Discussion on confirmation MAC CE for TSC network," 3GPP TSG-RAN WG2 #107bis, R2-1912725, Oct. 2019.

Oppo, "Discussion on confirmation MAC CE for TSC network," 3GPP TSG-RAN WG2 #108, R2-1915093, Nov. 2019.

LG Electronics Inc. et al., "Confirmation MAC CE for multiple CG configurations", 3GPP TSG-RAN WG2 Meeting #107bis, R2-1913143 (Revision of R2-1911201), Oct. 2019.

Samsung, "New CG Confirmation MAC CE," 3GPP TSG-RAN WG2 Meeting #108, R2-1915334, Nov. 2019.

WIPO, International Search Report and Written Opinion for International Application No. PCT/CN2020/072533, Oct. 26, 2020.

ZTE et al., "Consideration on CG Confirmation MAC CE in case that multiple CG for a given BWP," 3GPP TSG-RAN WG2 Meeting #107, R2-1910397, Aug. 2019.

Oppo, "Email discussion summary of [107#55][IIOT] CG/SPS for TSC," 3GPP TSG-RAN2 Meeting #107bis, R2-1912726, Oct. 2019.

Vivo, "Remaining issues on sidelink configured grant," 3GPP TSG-RAN WG2 Meeting #107bis, R2-1912258 (revision of R2-1910211), Oct. 2019.

EPO, Communication for EP Application No. 20914188.6, Jun. 24, 2024.

* cited by examiner

METHOD FOR INFORMATION REPORTING, TERMINAL DEVICE, AND NETWORK DEVICE

CROSS REFERENCE TO RELATED APPLICATION(S)

This application is a continuation of International Application No. PCT/CN2020/072533, filed on Jan. 16, 2020, the entire disclosure of which is incorporated herein by reference.

TECHNICAL FIELD

This application relates to the field of communication technology, and more particularly, to a method for information reporting, a terminal device, and a network device.

BACKGROUND

In order to provide a better service for time sensitive communication (TSC) traffic and ensure quality of service (QoS) of transmission of the TSC traffic, radio access network (RAN) 2 introduces multiple configured grant (CG) configurations for a terminal device. The network device indicates activation or deactivation of a CG through a physical downlink control channel (PDCCH). The terminal device reports a media access control-control element (MAC CE) to inform whether the PDCCH indicating activation or deactivation of the CG is received.

SUMMARY

In a first aspect, a method for information reporting is provided in implementations of this application. The method is applicable to a terminal device and includes the following. A media access control-control element (MAC CE) is reported to a network device, where the MAC CE indicates a state of a configured grant (CG) configured by the network device for the terminal device.

In a second aspect, a method for information reporting is provided in implementations of this application. The method is applicable to a network device and includes the following. A MAC CE reported by a terminal device is received, where the MAC CE indicates a state of a CG configured by the network device for the terminal device.

In a third aspect, a method for information reporting is provided in implementations of this application. The method is applicable to a terminal device and includes the following. At least one first physical downlink control channel (PDCCH) transmitted by a network device is received, where the at least one first PDCCH indicates activation or deactivation of a CG configured by the network device for the terminal device, and different first PDCCHs indicate activation or deactivation of different CGs. A MAC CE is reported to the network device, where the MAC CE indicates that the first PDCCH is received.

In a fourth aspect, a method for information reporting is provided in implementations of this application. The method is applicable to a network device and includes the following. At least one first PDCCH is transmitted to a terminal device, where the at least one first PDCCH indicates activation or deactivation of a CG configured by the network device for the terminal device, and different first PDCCHs indicate activation or deactivation of different CGs. A MAC CE reported by the terminal device is received, where the MAC CE indicates that the first PDCCH is received.

In a fifth aspect, a terminal device is provided in implementations of this application. The terminal device includes a transceiver, a memory configured to store computer programs, and a processor configured to invoke and execute the computer programs stored in the memory to cause the transceiver to perform the method in the first aspect.

In a sixth aspect, a network device is provided in implementations of this application. The network device includes a transceiver, a memory configured to store computer programs, and a processor configured to invoke and execute the computer programs stored in the memory to cause the transceiver to perform the method in the second aspect.

In a seventh aspect, a terminal device is provided in implementations of this application. The terminal device includes a transceiver, a memory configured to store computer programs, and a processor configured to invoke and execute the computer programs stored in the memory to cause the transceiver to perform the method in the third aspect.

In an eighth aspect, a network device is provided in implementations of this application. The network device includes a transceiver, a memory configured to store computer programs, and a processor configured to invoke and execute the computer programs stored in the memory to cause the transceiver to perform the method in the fourth aspect.

BRIEF DESCRIPTION OF THE DRAWINGS

In order to more clearly illustrate technical solutions in implementations of this application, the following will briefly introduce drawings required for description of implementations. Obviously, the drawings in the following description illustrate some implementations of this application. For those of ordinary skill in the art, other drawings can be obtained from these drawings without creative work.

DETAILED DESCRIPTION

The terms used in implementation part of this application are only used to illustrate specific implementations of this application, but not intended to limit this application. The terms "first", "second", "third", and "fourth" in the specification, claims, and drawings of this application are used to distinguish different objects, but not to describe a specific order. In addition, the terms "including", "comprising", "having", and any variations thereof are intended to cover non-exclusive inclusions.

Figure 1:
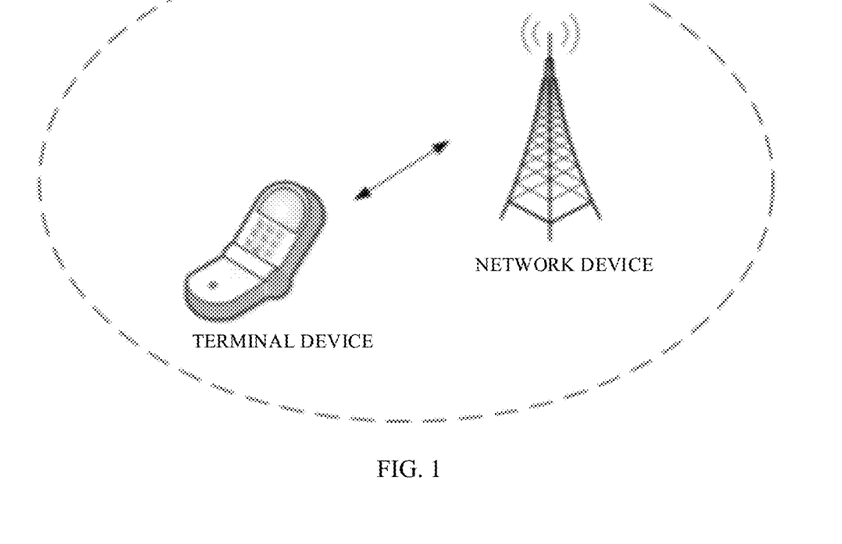
FIG. 1 is a schematic diagram of an architecture of a communication system provided in implementations of this application.

Referring to FIG. 1, FIG. 1 is a schematic diagram of an architecture of a communication system provided in implementations of this application. The communication system includes a network device and a user equipment (UE). As illustrated in FIG. 1, the network device can communicate with the UE. The communication system may be a global system for mobile communication (GSM), a code division multiple access (CDMA) system, a wideband code division multiple access (WCDMA) system, a worldwide interoperability for microwave access (WiMAX) system, a long term evolution (LTE) system, a 5th generation (5G) communication system, such as a new radio (NR) system, a communication system that integrates multiple communication technologies, such as a communication system that integrates LTE technologies and NR technologies, or a future evolved communication system. The form and the number of the network device and the UE illustrated in FIG. 1 are only for example, and do not constitute a limitation to implementations of this application.

The UE in this application is a device with a wireless communication function. The UE may be deployed on land, for example, deployed indoors or outdoors, and may be handheld, wearable, or vehicle-mounted. The UE may also be deployed on water, for example, on a ship, etc. The UE may also be deployed in the air, for example, on an airplane, an air balloon, a satellite, etc. The UE may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart home, etc. The UE may also be a handheld device, a vehicle-mounted device, a wearable device, or a computer device with a wireless communication function, or another processing device connected to a wireless modem. In different networks, the UE may have different names, such as, terminal device, access terminal, user unit, user station, mobile station, remote station, remote terminal, mobile device, user terminal, terminal, wireless communication device, user agent, or user device, cellular phone, cordless phone, session initiation protocol (SIP) phone, wireless local loop (WLL) station, personal digital assistant (PDA), terminal device in a 5G network or a future evolved network, etc.

The network device in this application is a device deployed in a wireless access network to provide a wireless communication function. For example, the network device may be a radio access network (RAN) device on access network side in a cellular network. The so-called RAN device is a device configured to connect the UE to a wireless network, and includes but is not limited to: an evolved node B (eNB), a radio network controller (RNC), a node B (NB), a base station controller (BSC), a base transceiver station (BTS), a home base station, for example, a home evolved node B or a home node B (HNB), a base band unit (BBU), or a mobility management entity (MME). For another example, the network device may also be a node device in a wireless local area network (WLAN), such as an access controller (AC), a gateway, or a wireless fidelity (Wi-Fi) access point (AP). For another example, the network device may also be a transmission node or a transmission reception point (TRP or TP) in an NR system.

5G industrial internet of things (IIoT) needs to support factory automation, transport industry, electrical power distribution, and other traffic. Based on their transmission requirements on delay and reliability, IIoT introduces a concept of time sensitive network (TSN) or time sensitive communication (TSC) network.

According to traffic characteristics of the TSC network, TSC traffic is usually traffic with high reliability and low delay. In most scenarios, the TSC traffic appears periodically. In order to provide a better service for the TSC traffic and ensure quality of service (QoS) of the TSC traffic, radio access network (RAN) 2 introduces multiple semi-persistent scheduling (SPS)/configured grant (CG) configurations for a terminal device.

In release 15 (R15), when multiple uplink (UL) SPSs are configured for the terminal device, the network device indicates to the terminal device which SPS to activate or deactivate in a one-to-one manner through downlink control information (DCI). In release 16 (R16), a current conclusion of RAN 2 is to use DCI to indicate activation or deactivation of an SPS/CG to the terminal device.

The terminal device reports a multiple entry configured grant confirmation media access control-control element (MAC CE) to the network device. The multiple entry configured grant confirmation MAC CE occupies multiple bits (e.g., 24 bits), and each bit corresponds to a CG. At present, a value of a bit indicates whether a PDCCH indicating activation or deactivation of a CG corresponding to the bit is received. For example, the value of 1 indicates that the PDCCH is received, and the value of 0 indicates that the PDCCH is not received.

Actually, before the terminal device reports the MAC CE, the network device may have used multiple PDCCHs to indicate different states such as activation/deactivation for a same CG. In this case, if interpreted according to an existing bit description, the network device cannot determine which PDCCH the indication of activation/deactivation received by the terminal device corresponds to, which results in inconsistent understanding of the state of the CG between the terminal device and the network device, and thus transmission or reception errors.

Method Implementation 1

Figure 2:
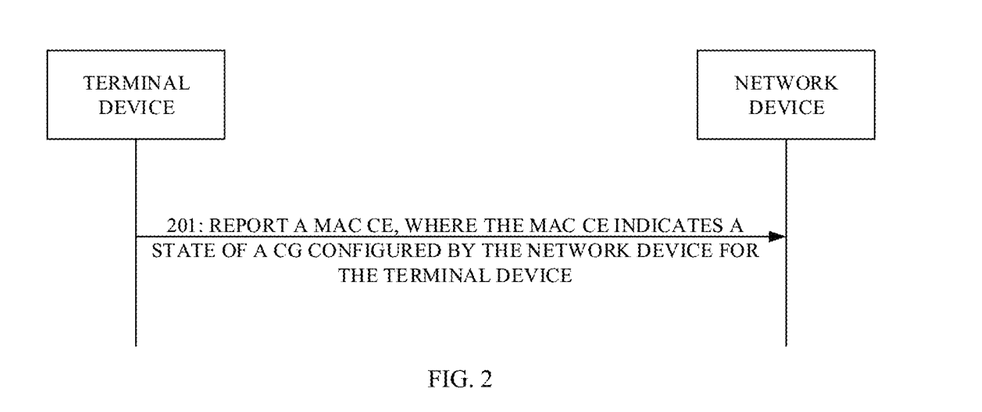
FIG. 2 is a schematic flowchart of a method for information reporting provided in implementations of this application.

Referring to FIG. 2, FIG. 2 is a schematic flowchart of a data transmission method provided in implementations of this application. The method includes the following.

At S201, a terminal device reports a MAC CE to a network device, where the MAC CE indicates a state of a CG configured by the network device for the terminal device.

Correspondingly, the network device receives the MAC CE reported by the terminal device.

The MAC CE includes a multiple entry configured grant confirmation MAC CE.

The state of the CG includes a deactivated state or an activated state.

Optionally, before S201, the method further includes the following: the network device transmits CG configuration information to the terminal device.

Correspondingly, the terminal device receives the CG configuration information transmitted by the network device.

The CG configuration information includes an index of at least one CG. If the CG configuration information includes an index of a CG, the CG configured by the network device for the terminal device is a type 2 CG or a type 1 CG. If the CG configuration information includes indexes of multiple CGs, the CG configured by the network device for the terminal device is a type 2 CG and/or a type 1 CG.

The type 1 CG is a CG that is activated or can be used once configured by RRC, and the type 2 CG is a CG that is activated or can be used through DCI indication after configured by RRC.

In an embodiment, before S201, the method further includes the following: multiple PDCCHs transmitted by the network device are received, where at least two PDCCHs among the multiple PDCCHs indicate activation or deactivation of a same CG.

One PDCCH indicates activation or deactivation of one CG, and/or one PDCCH indicates activation or deactivation of multiple CGs.

For one CG, one PDCCH can indicate only activation or deactivation of the CG.

In an embodiment, the MAC CE includes at least one indication bit, each indication bit corresponds to a CG, and a value of the indication bit indicates a state of the CG corresponding to the indication bit.

The indication bit occupies one or more bits.

In an embodiment, the value of the indication bit being a first value indicates that the state of the CG corresponding to the indication bit is an activated state, and the value of the indication bit being a second value indicates that the state of the CG corresponding to the indication bit is a deactivated state.

For example, when the indication bit occupies one bit, the first value is 0 or 1, and the second value is 0 or 1, and when the indication bit occupies two bits, the first value is 00 or 11, and the second value is 00 or 11.

For example, the network device configures four CGs for the terminal device, such as CG1, CG2, CG3, and CG4, and the terminal device sequentially receives PDCCH1, PDCCH2, PDCCH3, and PDCCH4 transmitted by the network device, where PDCCH1 indicates activation of CG1, and PDCCH2 indicates activation of CG2, PDCCH3 indicates activation of CG4, and PDCCH4 indicates deactivation of CG1 and CG4. The terminal device activates CG1 upon reception of PDCCH1, activates CG2 upon reception of PDCCH2, activates CG4 upon reception of PDCCH3, and deactivates CG1 and CG4 upon reception of PDCCH4. The terminal device does not receive PDCCH indicating activation or deactivation of CG3, and therefore, CG3 remains in a deactivated state. If the MAC CE reported by the terminal device to the network device includes 24 bits, a value of a bit corresponding to CG1 is 0, a value of a bit corresponding to CG2 is 1, a value of a bit corresponding to CG3 is 0, a value of a bit corresponding to CG4 is 0, and values of other bits are all 0.

It can be seen that the MAC CE reported by the terminal device directly indicates the state of the CG, which avoids inconsistent understanding of the state of the CG between the terminal device and the network device, thereby avoiding transmission or reception errors.

Method Implementation 2

Figure 3:
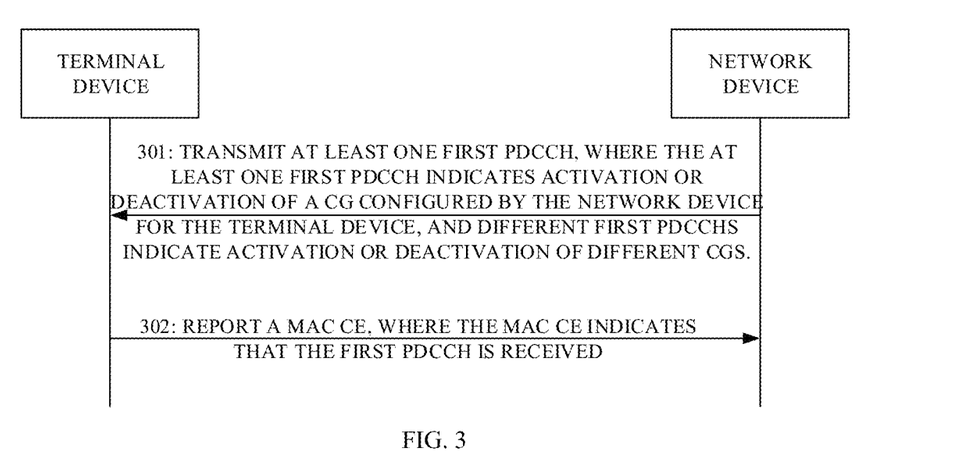
FIG. 3 is a schematic flowchart of another method for information reporting provided in implementations of this application.

Referring to FIG. 3, FIG. 3 is a schematic flowchart of a data transmission method provided in implementations of this application. The method includes the following.

At S301, a network device transmits at least one first PDCCH to a terminal device, where the at least one first PDCCH indicates activation or deactivation of a CG configured by the network device for the terminal device, and different first PDCCHs indicate activation or deactivation of different CGs.

Correspondingly, the terminal device receives the at least one first PDCCH transmitted by the network device.

At S302, the terminal device reports a MAC CE to the network device, where the MAC CE indicates that the first PDCCH is received.

Correspondingly, the network device receives the MAC CE reported by the terminal device.

The MAC CE includes a multiple entry configured grant confirmation MAC CE.

One first PDCCH indicates activation or deactivation of one CG, and/or one first PDCCH indicates activation or deactivation of multiple CGs.

Optionally, before step 301, the method further includes the following: the network device transmits CG configuration information to the terminal device.

Correspondingly, the terminal device receives the CG configuration information transmitted by the network device.

The CG configuration information includes an index of at least one CG. If the CG configuration information includes an index of a CG, the CG configured by the network device for the terminal device is a type 2 CG or a type 1 CG. If the CG configuration information includes indexes of multiple CGs, the CG configured by the network device for the terminal device is a type 2 CG and/or a type 1 CG.

The type 1 CG is a CG that is activated or can be used once configured by RRC, and the type 2 CG is a CG that is activated or can be used through DCI indication after configured by RRC.

In an embodiment, before the MAC CE reporting or between the MAC CE reporting and last MAC CE reporting, the terminal device does not expect to receive at least one second PDCCH, the at least one second PDCCH includes an indication of activation or deactivation of a target CG, and the target CG is an activated or deactivated CG indicated by the at least one first PDCCH.

For example, the network device configures four CGs for the terminal device, such as CG1, CG2, CG3, and CG4, the terminal device receives two PDCCHs transmitted by the network device, such as PDCCH1 and PDCCH2, where PDCCH1 indicates activation of CG1, and PDCCH2 indicates activation of CG2. Then, before the MAC CE reporting or between the MAC CE reporting and last MAC CE reporting, the terminal device does not expect to receive at least one PDCCH, where the at least one PDCCH contains indication of activation or deactivation of CG1 and/or CG2.

In an embodiment, before the MAC CE reporting or between the MAC CE reporting and last MAC CE reporting, the terminal device does not expect to receive at least one third PDCCH indicating activation or deactivation of a target CG, and the target CG is an activated or deactivated CG indicated by the at least one first PDCCH.

For example, the network device configures four CGs for the terminal device, such as CG1, CG2, CG3, and CG4, the terminal device receives two PDCCHs transmitted by the network device, such as PDCCH1 and PDCCH2, where PDCCH1 indicates activation of CG1, and PDCCH2 indicates activation of CG2. Then, before the MAC CE reporting or between the MAC CE reporting and last MAC CE reporting, the terminal device does not expect to receive at least one PDCCH indicating activation or deactivation of CG1, or before the MAC CE reporting or between the MAC CE reporting and last MAC CE reporting, the terminal device does not expect to receive at least one PDCCH indicating activation or deactivation of CG2.

In an embodiment, the MAC CE includes at least one indication bit, each indication bit corresponds to a CG, and a value of the indication bit indicates whether a first PDCCH corresponding to the CG corresponding to the indication bit is received.

The indication bit occupies one or more bits.

In an embodiment, the value of the indication bit being a first value indicates that the first PDCCH corresponding to the CG corresponding to the indication bit is received, and the value of the indication bit being a second value indicates that the first PDCCH corresponding to the CG corresponding to the indication bit is not received.

For example, when the indication bit occupies one bit, the first value is 0 or 1, and the second value is 0 or 1, and when the indication bit occupies two bits, the first value is 00 or 11, and the second value is 00 or 11.

For example, assuming that the network device configures four CGs for the terminal device, such as CG1, CG2, CG3, and CG4, the terminal device receives PDCCH1 transmitted by the network device, where PDCCH1 indicates activation of CG1, the terminal device activates CG1, and the terminal device receives PDCCH2 transmitted by the network device, where PDCCH2 indicates activation of CG2, the terminal device activates CG2. The terminal device has an available UL grant and reports the MAC CE. If the MAC CE reported by the terminal device to the network device includes 24 bits, a value of a bit corresponding to CG1 is 1, a value of a bit corresponding to CG2 is 1, and values of other bits are all 0. The terminal device receives PDCCH3 transmitted by the network device, where PDCCH3 indicates deactivation of CG1 and CG2, and the terminal device deactivates CG1 and CG2. The terminal device receives PDCCH4 transmitted by the network device, where PDCCH4 indicates activation of CG3, and the terminal device activates CG3. The terminal device has an available UL grant and reports the MAC CE. If the MAC CE reported by the terminal device to the network device includes 24 bits, a value of a bit corresponding to CG1 is 0, a value of a bit corresponding to CG2 is 0, a value of a bit corresponding to CG3 is 1, and values of other bits are all 0.

It can be seen that since the network device does not use different PDCCHs to indicate activation or deactivation of a same CG, the MAC CE reported by the terminal device indicates whether the PDCCH is received, which will not result in inconsistent understanding of the state of the CG between the terminal device and the network device, thereby avoiding transmission or reception errors.

Figure 4:
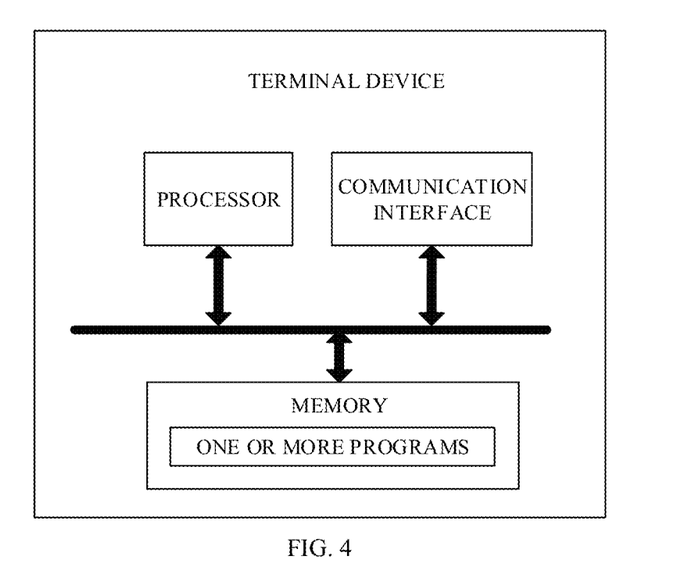
FIG. 4 is a schematic structural diagram of a terminal device provided in implementations of this application.

Referring to FIG. 4, FIG. 4 illustrates a terminal device provided in implementations of this application. The terminal device includes one or more processors, one or more memories configured to store one or more programs, and one or more communication interfaces. The one or more programs are configured to be executed by the one or more processors.

Terminal Device Implementation 1 Corresponding to Method Implementation 1

The programs include instructions configured to report a MAC CE to a network device, where the MAC CE indicates a state of a CG configured by the network device for a terminal device.

In an embodiment, the programs further include instructions configured to receive multiple PDCCHs transmitted by the network device before reporting the MAC CE to the network device, where at least two PDCCHs among the multiple PDCCHs indicate activation or deactivation of a same CG.

In an embodiment, the MAC CE includes at least one indication bit, each indication bit corresponds to a CG, and a value of the indication bit indicates a state of the CG corresponding to the indication bit.

In an embodiment, the value of the indication bit being a first value indicates that the state of the CG corresponding to the indication bit is an activated state, and the value of the indication bit being a second value indicates that the state of the CG corresponding to the indication bit is a deactivated state.

It should be noted that, for the specific implementation process of this implementation, reference may be made to the specific implementation process described in the foregoing method implementation 1, which will not be described herein.

Terminal Device Implementation 2 Corresponding to Method Implementation 2

The programs include instructions configured to receive at least one first PDCCH transmitted by a network device, where the at least one first PDCCH indicates activation or deactivation of a CG configured by the network device for the terminal device, and different first PDCCHs indicate activation or deactivation of different CGs, and report a MAC CE to the network device, where the MAC CE indicates that the first PDCCH is received.

In an embodiment, before the MAC CE reporting or between the MAC CE reporting and last MAC CE reporting, the terminal device does not expect to receive at least one second PDCCH, the at least one second PDCCH includes an indication of activation or deactivation of a target CG, and the target CG is an activated or deactivated CG indicated by the at least one first PDCCH.

In an embodiment, before the MAC CE reporting or between the MAC CE reporting and last MAC CE reporting, the terminal device does not expect to receive at least one third PDCCH indicating activation or deactivation of a target CG, and the target CG is an activated or deactivated CG indicated by the at least one first PDCCH.

In an embodiment, the MAC CE includes at least one indication bit, each indication bit corresponds to a CG, and a value of the indication bit indicates whether a first PDCCH corresponding to the CG corresponding to the indication bit is received.

In an embodiment, the value of the indication bit being a first value indicates that the first PDCCH corresponding to the CG corresponding to the indication bit is received, and the value of the indication bit being a second value indicates that the first PDCCH corresponding to the CG corresponding to the indication bit is not received.

It should be noted that, for the specific implementation process of this implementation, reference may be made to the specific implementation process described in the foregoing method implementation 2, which is not described herein.

Figure 5:
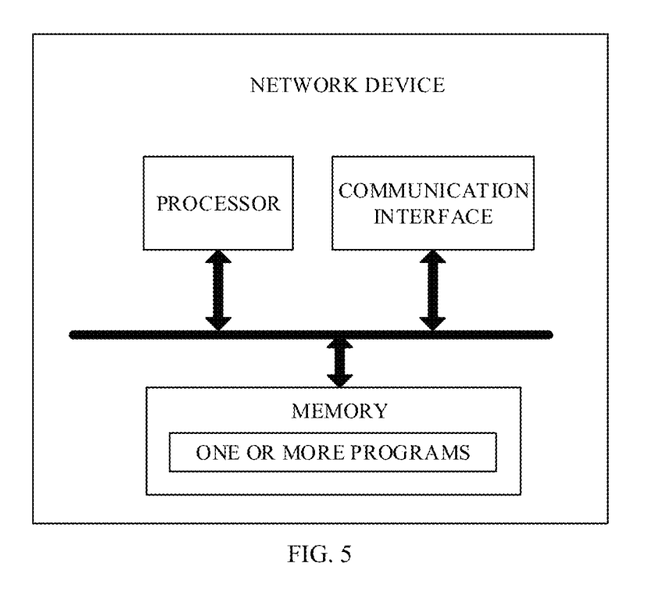
FIG. 5 is a schematic structural diagram of a network device provided in implementations of this application.

Referring to FIG. 5, FIG. 5 illustrates a network device provided in implementations of this application. The network device includes one or more processors, one or more memories configured to store one or more programs, and one or more communication interfaces. The one or more programs are configured to be executed by the one or more processors.

Network Device Implementation 1 Corresponding to Method Implementation 1

The programs include instructions configured to receive a MAC CE reported by a terminal device, where the MAC CE indicates a state of a CG configured by the network device for the terminal device.

In an embodiment, the programs further include instructions configured to transmit multiple PDCCHs to the terminal device before receiving the MAC CE reported by the terminal device, where at least two PDCCHs among the multiple PDCCHs indicate activation or deactivation of a same CG.

In an embodiment, the MAC CE includes at least one indication bit, each indication bit corresponds to a CG, and a value of the indication bit indicates a state of the CG corresponding to the indication bit.

In an embodiment, the value of the indication bit being a first value indicates that the state of the CG corresponding to the indication bit is an activated state, and the value of the indication bit being a second value indicates that the state of the CG corresponding to the indication bit is a deactivated state.

It should be noted that, for the specific implementation process of this implementation, reference may be made to the specific implementation process described in the foregoing method implementation 1, which is not described herein.

Network Device Implementation 2 Corresponding to Method Implementation 2

The programs include instructions configured to transmit at least one first PDCCH to a terminal device, where the at least one first PDCCH indicates activation or deactivation of a CG configured by the network device for the terminal device, and different first PDCCHs indicate activation or deactivation of different CGs, and receive a MAC CE reported by the terminal device, where the MAC CE indicates that the first PDCCH is received.

In an embodiment, before the MAC CE reporting or between the MAC CE reporting and last MAC CE reporting, the terminal device does not expect to receive at least one second PDCCH, the at least one second PDCCH includes an indication of activation or deactivation of a target CG, and the target CG is an activated or deactivated CG indicated by the at least one first PDCCH.

In an embodiment, before the MAC CE reporting or between the MAC CE reporting and last MAC CE reporting, the terminal device does not expect to receive at least one third PDCCH indicating activation or deactivation of a target CG, and the target CG is an activated or deactivated CG indicated by the at least one first PDCCH.

In an embodiment, the MAC CE includes at least one indication bit, each indication bit corresponds to a CG, and a value of the indication bit indicates whether a first PDCCH corresponding to the CG corresponding to the indication bit is received.

In an embodiment, the value of the indication bit being the first value indicates that the first PDCCH corresponding to the corresponding CG is received, and the value of the indication bit being a second value indicates that the first PDCCH corresponding to the CG corresponding to the indication bit is not received.

It should be noted that, for the specific implementation process of this implementation, reference may be made to the specific implementation process described in the foregoing method implementation 2, which is not described herein.

Figure 6:
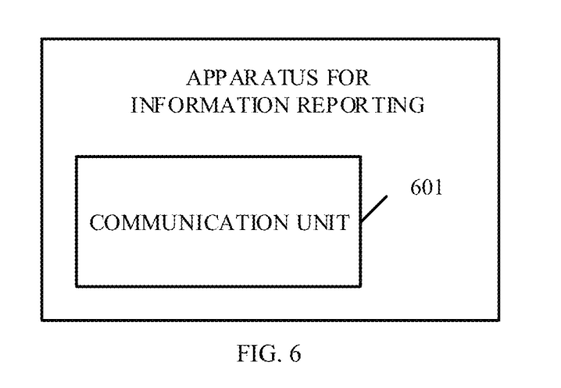
FIG. 6 is a schematic structural diagram of an apparatus for information reporting provided in implementations of this application.

Referring to FIG. 6, FIG. 6 illustrates an apparatus for information reporting provided in implementations of this application. The apparatus includes a communication unit 601.

Apparatus Implementation 1

Apparatus implementation 1 is applicable to the terminal device in method implementation 1. The communication unit 601 is configured to report a MAC CE to a network device, where the MAC CE indicates a state of a CG configured by the network device for the terminal device.

In an embodiment, the communication unit 601 is further configured to receive multiple PDCCHs transmitted by the network device before reporting the MAC CE to the network device, where at least two PDCCHs among the multiple PDCCHs indicate activation or deactivation of a same CG.

In an embodiment, the MAC CE includes at least one indication bit, each indication bit corresponds to a CG, and a value of the indication bit indicates a state of the CG corresponding to the indication bit.

In an embodiment, the value of the indication bit being a first value indicates that the state of the CG corresponding to the indication bit is an activated state, and the value of the indication bit being a second value indicates that the state of the CG corresponding to the indication bit is a deactivated state.

Apparatus Implementation 2

Apparatus implementation 2 is applicable to the network device in method implementation 1. The communication unit 601 is configured to receive a MAC CE reported by a terminal device, where the MAC CE indicates a state of a CG configured by the network device for the terminal device.

In an embodiment, the communication unit 601 is further configured to transmit multiple PDCCHs to the terminal device before receiving the MAC CE reported by the terminal device, where at least two PDCCHs among the multiple PDCCHs indicate activation or deactivation of a same CG.

In an embodiment, the MAC CE includes at least one indication bit, each indication bit corresponds to a CG, and a value of the indication bit indicates a state of the CG corresponding to the indication bit.

In an embodiment, the value of the indication bit being a first value indicates that the state of the CG corresponding to the indication bit is an activated state, and the value of the indication bit being a second value indicates that the state of the CG corresponding to the indication bit is a deactivated state.

Apparatus Implementation 3

Apparatus implementation 3 is applicable to the terminal device in method implementation 2, the communication unit 601 is configured to receive at least one first PDCCH transmitted by a network device, where the at least one first PDCCH indicates activation or deactivation of a CG configured by the network device for the terminal device, and different first PDCCHs indicate activation or deactivation of different CGs.

The communication unit 601 is further configured to report a MAC CE to the network device, where the MAC CE indicates that the first PDCCH is received.

In an embodiment, before the MAC CE reporting or between the MAC CE reporting and last MAC CE reporting, the terminal device does not expect to receive at least one second PDCCH, the at least one second PDCCH includes an indication of activation or deactivation of a target CG, and the target CG is an activated or deactivated CG indicated by the at least one first PDCCH.

In an embodiment, before the MAC CE reporting or between the MAC CE reporting and last MAC CE reporting, the terminal device does not expect to receive at least one third PDCCH indicating activation or deactivation of a target CG, and the target CG is an activated or deactivated CG indicated by the at least one first PDCCH.

In an embodiment, the MAC CE includes at least one indication bit, each indication bit corresponds to a CG, and a value of the indication bit indicates whether a first PDCCH corresponding to the CG corresponding to the indication bit is received.

In an embodiment, the value of the indication bit being a first value indicates that the first PDCCH corresponding to the CG corresponding to the indication bit is received, and the value of the indication bit being a second value indicates that the first PDCCH corresponding to the CG corresponding to the indication bit is not received.

Apparatus Implementation 4

Apparatus implementation 4 is applicable to the network device in method implementation 2. The communication unit 601 is configured to transmit at least one first PDCCH to a terminal device, where the at least one first PDCCH indicates activation or deactivation of a CG configured by the network device for the terminal device, and different first PDCCHs indicate activation or deactivation of different CGs.

The communication unit 601 is further configured to receive a MAC CE reported by the terminal device, where the MAC CE indicates that the first PDCCH is received.

In an embodiment, before the MAC CE reporting or between the MAC CE reporting and last MAC CE reporting, the terminal device does not expect to receive at least one second PDCCH, the at least one second PDCCH includes an indication of activation or deactivation of a target CG, and the target CG is an activated or deactivated CG indicated by the at least one first PDCCH.

In an embodiment, before the MAC CE reporting or between the MAC CE reporting and last MAC CE reporting, the terminal device does not expect to receive at least one third PDCCH indicating activation or deactivation of a target CG, and the target CG is an activated or deactivated CG indicated by the at least one first PDCCH.

In an embodiment, the MAC CE includes at least one indication bit, each indication bit corresponds to a CG, and a value of the indication bit indicates whether a first PDCCH corresponding to the CG corresponding to the indication bit is received.

In an embodiment, the value of the indication bit being a first value indicates that the first PDCCH corresponding to the CG corresponding to the indication bit is received, and the value of the indication bit being a second value indicates that the first PDCCH corresponding to the CG corresponding to the indication bit is not received.

It should be noted that, the communication unit 601 may be implemented by a communication interface.

A computer storage medium is also provided in implementations of this application. The computer storage medium is configured to store computer programs for electronic data interchange. The computer programs are operable with a computer to perform any method in method implementations. The computer includes a terminal device or a network device.

A computer program product is also provided in implementations of this application. The computer program product includes computer program instructions which are operable with a computer to perform any method in method implementations. The computer program product may be a software installation package. The computer includes a terminal device or a network device.

A chip is also provided in implementations of this application. The chip includes computer program instructions which are operable with a computer to perform any method in method implementations. The computer includes a UE.

A computer program is also provided in implementations of this application. The computer program is operable with a computer to perform any method in method implementations. The computer includes a UE.

It should be noted that, for the sake of simplicity, the foregoing method implementations are described as a series of action combinations, however, it will be appreciated by those skilled in the art that this application is not limited by the sequence of actions described. According to this application, certain steps or operations may be performed in other order or simultaneously. Besides, it will be appreciated by those skilled in the art that the implementations described in the specification are exemplary implementations and the actions and modules involved are not necessarily essential to this application.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of this application may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of this application essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of this application. The memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), disk or compact disc (CD), and so on.

Implementations of this application are described in detail above, and specific examples are used herein to illustrate principles and implementations of this application. The illustration of implementations above are only used to help understand the methods and core ideas of this application. At the same time, for those of ordinary skill in the art, based on the ideas of this application, there may be changes in the specific implementations and scope of this application. In conclusion, the content of this specification should not be construed as a limitation to this application.

What is claimed is:

1. A method for information reporting, being applicable to a terminal device and comprising:
   receiving configured grant (CG) configuration information from a network device;
   receiving a plurality of physical downlink control channels (PDCCH) transmitted by the network device, wherein at least two PDCCHs among the plurality of PDCCHs indicate activation or deactivation of a same CG; and
   reporting a media access control-control element (MAC CE) generated by the terminal device to the network device, the MAC CE indicating a state of a configured grant (CG) configured by the network device for the terminal device.

2. The method of claim 1, wherein the MAC CE comprises at least one indication bit, each indication bit corresponds to a CG, and a value of the indication bit indicates a state of the CG corresponding to the indication bit.

3. The method of claim 2, wherein:
   the value of the indication bit being a first value indicates that the state of the CG corresponding to the indication bit is an activated state; and
   the value of the indication bit being a second value indicates that the state of the CG corresponding to the indication bit is a deactivated state.

4. A terminal device comprising:
   a transceiver;
   a memory configured to store computer programs; and
   a processor configured to invoke and execute the computer programs stored in the memory to cause the transceiver to perform the method of claim 1.

5. The terminal device of claim 4, wherein the MAC CE comprises at least one indication bit, each indication bit corresponds to a CG, and a value of the indication bit indicates a state of the CG corresponding to the indication bit.

6. The terminal device of claim 5, wherein:
   the value of the indication bit being a first value indicates that the state of the CG corresponding to the indication bit is an activated state; and
   the value of the indication bit being a second value indicates that the state of the CG corresponding to the indication bit is a deactivated state.

7. A method for information reporting, being applicable to a network device and comprising:
   transmitting configured grant (CG) configuration information to a terminal device;
   transmitting a plurality of physical downlink control channels (PDCCH) to the terminal device, wherein at least two PDCCHs among the plurality of PDCCHs indicate activation or deactivation of a same CG; and
   receiving a media access control-control element (MAC CE) generated and reported by the terminal device, the MAC CE indicating a state of a configured grant (CG) configured by the network device for the terminal device.

8. A network device comprising:
   a transceiver;
   a memory configured to store computer programs; and
   a processor configured to invoke and execute the computer programs stored in the memory to cause the transceiver to perform the method of claim 7.

* * * * *